United States Patent
Wu et al.

(10) Patent No.: US 11,604,503 B2
(45) Date of Patent: Mar. 14, 2023

(54) VIRTUAL IMAGE DISPLAY SYSTEM AND POWER MANAGEMENT METHOD

(71) Applicant: HTC Corporation, Taoyuan (TW)

(72) Inventors: Chuan-Li Wu, Taoyuan (TW); LungTing Chin, Taoyuan (TW); Shang Ze Lin, Taoyuan (TW); Yu Chang Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/717,155

(22) Filed: Apr. 11, 2022

(65) Prior Publication Data

US 2023/0023879 A1 Jan. 26, 2023

Related U.S. Application Data (60) Provisional application No. 63/225,580, filed on Jul. 26, 2021.

(51) Int. Cl.
*G06F 1/3212* (2019.01)
*G06F 1/324* (2019.01)
*G09G 3/00* (2006.01)

(52) U.S. Cl.
CPC ............ *G06F 1/3212* (2013.01); *G06F 1/324* (2013.01); *G09G 3/001* (2013.01); *G09G 2330/023* (2013.01)

(58) Field of Classification Search
CPC ........ G06F 1/3212; G06F 1/324; G09G 3/001
USPC ........................................................ 345/212
See application file for complete search history.

(56) References Cited

U.S. PATENT DOCUMENTS

| | | | |
|---|---|---|---|
| 2007/0145953 A1* | 6/2007 | Asai | G01R 31/367 320/149 |
| 2018/0164867 A1 | 6/2018 | Zhang et al. | |
| 2020/0150740 A1* | 5/2020 | Zhang | G06F 1/1632 |
| 2020/0225487 A1* | 7/2020 | Huang | G02B 3/0062 |

FOREIGN PATENT DOCUMENTS

| | | |
|---|---|---|
| CN | 108475935 | 6/2021 |
| EP | 2911036 | 8/2015 |
| TW | 201830953 | 8/2018 |

OTHER PUBLICATIONS

"Office Action of Taiwan Counterpart Application", dated Oct. 19, 2022, p. 1-p. 7.
"Search Report of Europe Counterpart Application", dated Nov. 3, 2022, p. 1-p. 4.

* cited by examiner

*Primary Examiner* — Mark Edwards
(74) *Attorney, Agent, or Firm* — JCIPRNET (57) ABSTRACT

A virtual image display system, including a handheld electronic device having a first battery and a virtual image display having a second battery, is provided. The handheld electronic device and the virtual image display are coupled to each other. The handheld electronic device is used to calculate a power supply time of the first battery; calculate an expected discharge time of the second battery under a discharge condition; compare the power supply time and the expected discharge time to generate a comparison result; and adjust a supply current provided by the first battery to the virtual image display according to the comparison result.

12 Claims, 5 Drawing Sheets

VIRTUAL IMAGE DISPLAY SYSTEM AND POWER MANAGEMENT METHOD

CROSS-REFERENCE TO RELATED APPLICATION

This application claims the priority benefit of U.S. provisional application Ser. No. 63/225,580, filed on Jul. 26, 2021. The entirety of the above-mentioned patent application is hereby incorporated by reference herein and made a part of this specification.

TECHNICAL FIELD

The disclosure relates to a virtual image display system and a power management method, and more particularly to a virtual image display system and a power management method thereof, which can prolong the usage time of the virtual image display system.

DESCRIPTION OF RELATED ART

With the vigorous development of the transmission technology of 5th generation (5G) mobile networks and the high-performance computing and processing capabilities of 5G handheld electronic devices, power and data are transmitted to virtual image displays through interfaces such as universal serial bus (USB) and USB on-the-go (OTG) to achieve a virtual real-time interactive experience. The application market of mobile virtual reality (VR) and augmented reality (AR) has gradually begun to attract attention and lively discussion.

However, the conventional battery of the virtual image display is only set for the purpose of regulating the instantaneous load of the system, and together with the main requirement of wearing comfort, the size and capacity specifications thereof are less than the specifications used in the handheld electronic device. In other words, the power supply of the virtual image display mainly depends on the battery supply of the handheld electronic device. The battery of the handheld electronic device not only provides the power consumption of the handheld electronic device itself, but also shoulders the power supply task of the virtual image display. Such combination causes the handheld electronic device to be rapidly discharged and forced to enter the shutdown state, while the battery in the original virtual image display still retains the remaining capacity and is not fully utilized, making it impossible to provide a user with more usage time. It can be seen that the power management between the handheld electronic device and the virtual image display is also another key that affects the user experience, so how to improve the overall usage time to achieve the best user experience is an issue to be solved by the disclosure.

SUMMARY

The disclosure provides a virtual image display system and a power management method, which can prolong an effective usage time of a virtual image display system.

The virtual image display system of the disclosure includes a handheld electronic device having a first battery and a virtual image display having a second battery and coupled to the handheld electronic device. The handheld electronic device is used to calculate a power supply time of the first battery; calculate an expected discharge time of the second battery under a discharge condition; compare the power supply time and the expected discharge time to generate a comparison result; and adjust a supply current provided by the first battery to the virtual image display according to the comparison result.

The power management method of the disclosure is applicable between a handheld electronic device having a first battery and a virtual image display having a second batter. The steps of the power management method include calculating a power supply time of the first battery; calculating an expected discharge time of the second battery under a discharge condition; comparing the power supply time and the expected discharge time to generate a comparison result; and adjusting a supply current provided by the first battery to the virtual image display according to the comparison result.

Based on the above, the virtual image display system and the power management method of the disclosure calculates the power supply time of the first battery of the handheld electronic device and the expected discharge time of the second battery of the virtual image display, and compares the power supply time and the expected discharge time, thereby adjusting the supply current provided by the handheld electronic device to the virtual image display. The virtual image display system and the power management method of the disclosure improve the usage efficiency of the batteries in the handheld electronic device and the virtual image display through adjusting the supply current provided by the handheld electronic device to improve the overall usage time of the virtual image display system.

DETAILED DESCRIPTION OF DISCLOSED EMBODIMENTS

Figure 1:
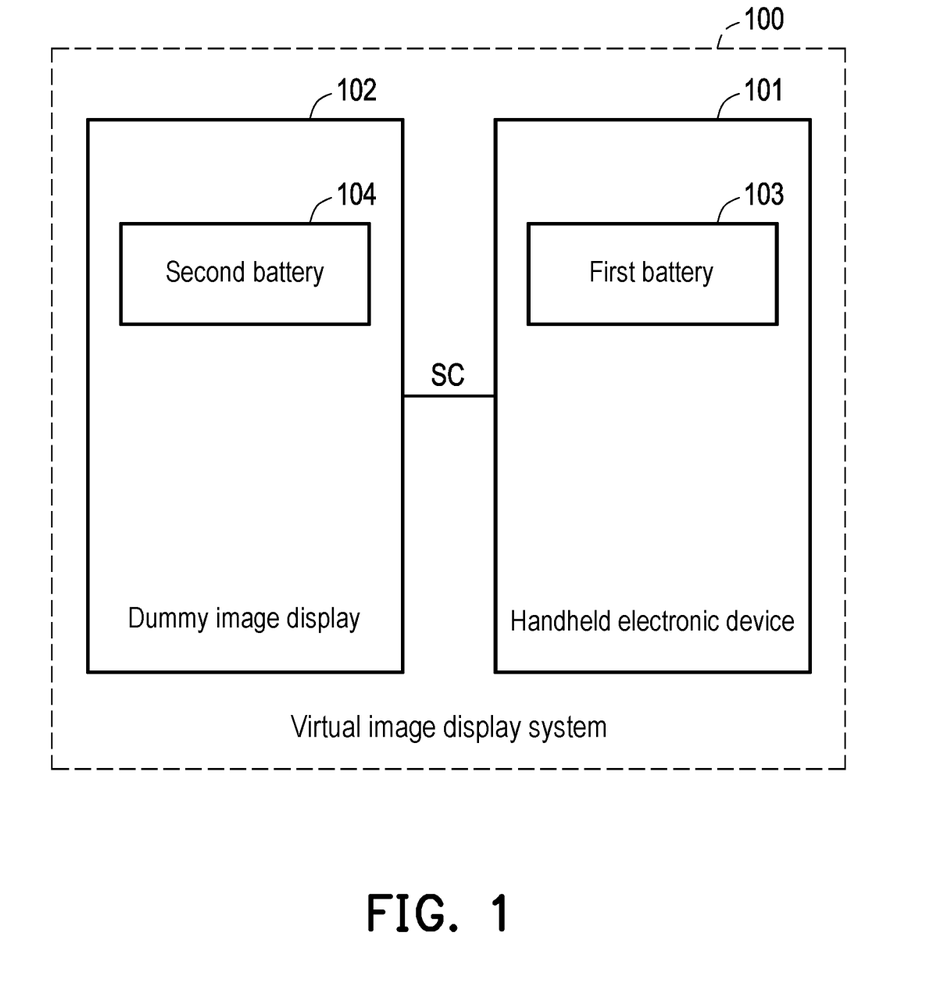
FIG. 1 is a block diagram of a virtual image display system according to an embodiment of the disclosure.

Please refer to FIG. 1. FIG. 1 is a block diagram of a virtual image display system according to an embodiment of the disclosure. A virtual image display system 100 includes a handheld electronic device 101 having a first battery 103 and a virtual image display 102 having a second battery 104, wherein the handheld electronic device 101 and the virtual image display 102 are coupled to each other. The handheld electronic device 101 is used to provide a supply current SC to the virtual image display 102.

In the virtual image display system 100, the handheld electronic device 101 may be any handheld computing device with basic input-output and computing functions, such as a smart phone or a tablet computer. The virtual image display 102 may be any wearable display device for virtual reality (VR) or augmented reality (AR), such as a head-mounted display device or virtual reality glasses. The first battery 103 and the second battery 104 may be any form of rechargeable batteries, such as nickel-cadmium batteries, nickel-hydrogen batteries, lithium-ion batteries, and lithium-polymer batteries.

In the virtual image display system 100, the first battery 103 is used to provide power to the handheld electronic device 101, and may provide the supply current SC to the virtual image display 102. The second battery 104 may be used to provide auxiliary power to the virtual image display 102. In the embodiment, the total capacitance of the first battery 103 may be greater than the total capacitance of the second battery 104.

Figure 2:
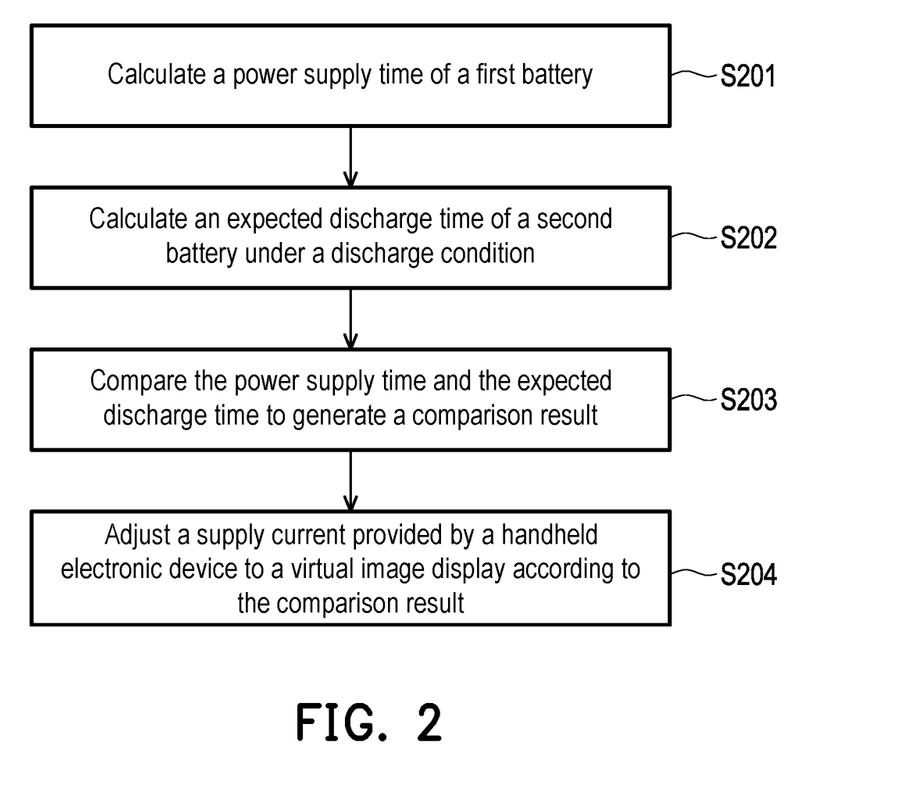
FIG. 2 is a flowchart of a power management method according to an embodiment of the disclosure.

Please refer to FIG. 1 and FIG. 2. FIG. 2 is a flowchart of a power management method according to an embodiment of the disclosure. In the power management method of the embodiment, in Step S201, the handheld electronic device 101 may calculate a power supply time $T_{HED}$ of the first battery 103. The handheld electronic device 101 may calculate the power supply time $T_{HED}$ of the first battery 103 according to the existing power of the first battery 103 and the power consumption state of the first battery 103.

In Step S202, the handheld electronic device 101 may calculate an expected discharge time $T_{VID}$ of the second battery 104 of the virtual image display 102 under a discharge condition DR. The designer may set the discharge condition DR of the second battery 104 according to the specifications of the second battery 104. In Step S202, the handheld electronic device 101 may calculate the expected discharge time $T_{VID}$ of the second battery 104 according to the discharge condition DR and the existing power of the second battery 104.

In Step S203, the handheld electronic device 101 compares the power supply time $T_{HED}$ and the expected discharge time $T_{VID}$ to generate a comparison result RS.

If in Step S203, the comparison result RS generated by the handheld electronic device 101 shows that the power supply time $T_{HED}$ is greater than or equal to the expected discharge time $T_{VID}$, it means that the first battery 103 still has enough power to supply the operation of the virtual image display 102. On the contrary, if the comparison result RS generated in Step S203 shows that the power supply time $T_{HED}$ is less than the expected discharge time $T_{VID}$, it means that the power of the first battery 103 is insufficient.

Further, in Step S204, the handheld electronic device 101 may adjust the supply current SC provided by the handheld electronic device 101 to the virtual image display 102 through a power manager of the virtual image display 102 according to the comparison result RS generated in Step S203.

In detail, in the embodiment of the disclosure, if the comparison result RS shows that the power supply time $T_{HED}$ is greater than or equal to the expected discharge time $T_{VID}$, the virtual image display 102 may provide partial current for the virtual image display 102 to operate according to the power of the second battery 104, and the handheld electronic device 101 may perform a lowering action of the supply current SC, thereby prolonging the usable time of the first battery 103. In addition, if the comparison result RS shows that the power supply time $T_{HED}$ is less than the expected discharge time $T_{VID}$, the virtual image display system 100 may execute a corresponding power saving mechanism to prolong the usage time of the virtual image display system 100.

Figure 3:
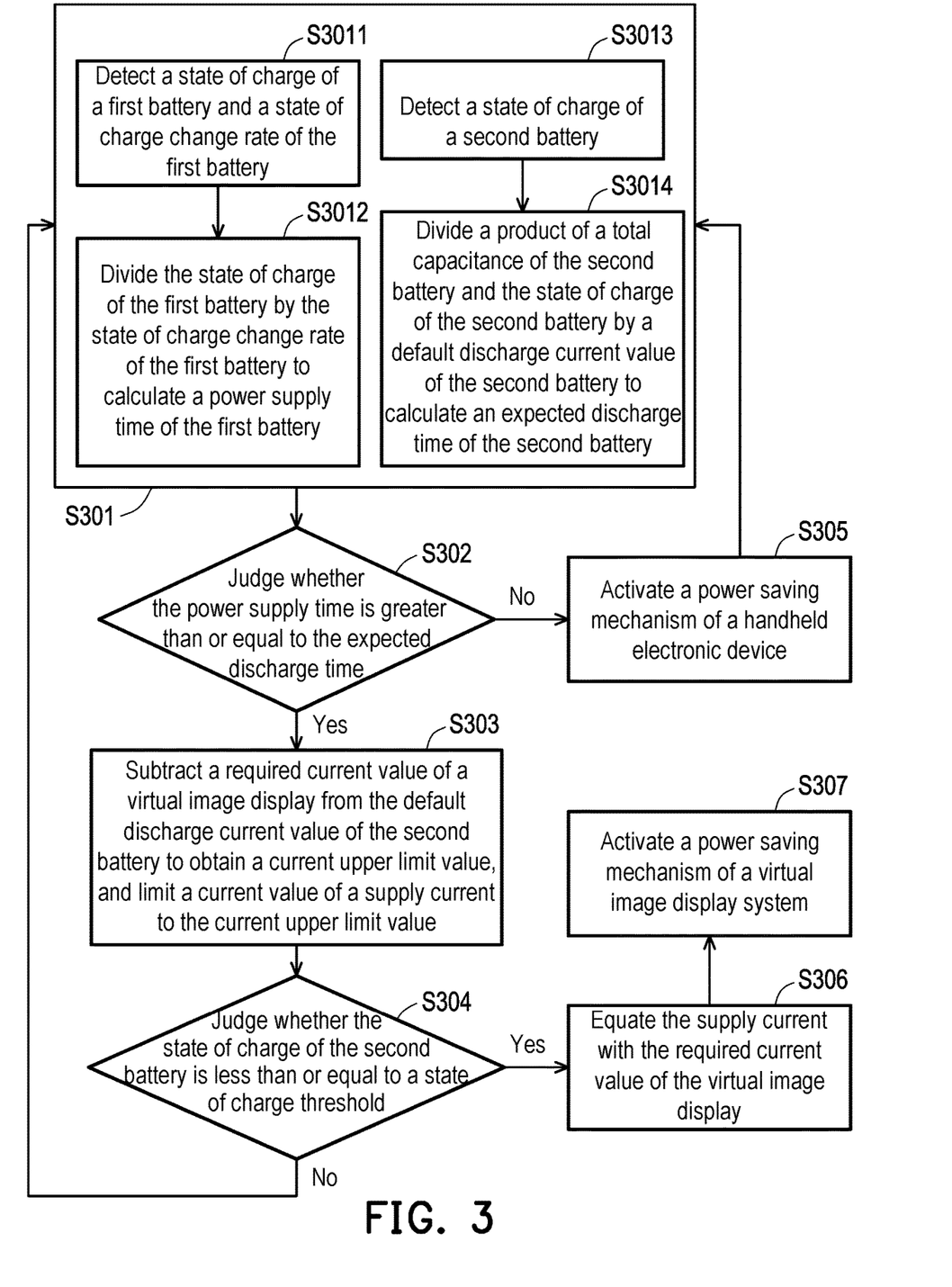
FIG. 3 is a flowchart of a power management method according to another embodiment of the disclosure.

Please refer to FIG. 1 and FIG. 3. FIG. 3 is a flowchart of a power management method according to an embodiment of the disclosure. In FIG. 3, Step S301 includes Sub-steps S3011 to S3014. In Sub-step S3011, the handheld electronic device 101 may detect a state of charge $SOC_{HED}$ of the first battery 103 and a state of charge change rate RC of the first battery 103. In the embodiment of the disclosure, the handheld electronic device 101 may detect the state of charge $SOC_{HED}$ of the first battery 103 in a time difference dT, and calculate a change value of the state of charge $SOC_{HED}$ in the time difference dT to obtain a state of charge change $dSOC_{HED}$. The handheld electronic device 101 divides the state of charge $dSOC_{HED}$ by the time difference dT to obtain the state of charge change rate RC. In Sub-step S3012, the handheld electronic device 101 may divide the state of charge $SOC_{HED}$ of the first battery 103 by the state of charge change rate RC of the first battery 103 to calculate the power supply time $T_{HED}$ ($T_{HED} = SOC_{HED}/RC$) of the first battery.

In addition, in Sub-step S3013, the handheld electronic device 101 detects a state of charge $SOC_{VID}$ of the second battery 104. Next, in Sub-step S3014, the handheld electronic device 101 calculates an expected discharge time $T_{VID}$ of the second battery 104 according to the state of charge $SOC_{VID}$ and the discharge condition DR. The discharge condition DR includes a total capacitance $C_{VID}$ in the specifications of the second battery 104. The designer may define a default discharge current $I_{BAT}$ of the second battery 104 according to the specifications of the second battery 104 and usage requirements. In addition, in Sub-step S3014, the handheld electronic device 101 may divide the product of the total capacitance $C_{VID}$ of the second battery and the state of charge $SOC_{VID}$ of the second battery 104 by the default discharge current value $I_{BAT}$ of the second battery 104 to calculate the expected discharge time $T_{VID}$ ($T_{VID} = C_{VID} \times SOC_{VID}/I_{BAT}$) of the second battery 104.

Next, in Step S302, the handheld electronic device 101 may compare the power supply time $T_{HED}$ and the expected discharge time $T_{VID}$, and judge whether the power supply time $T_{HED}$ is greater than or equal to the expected discharge time $T_{VID}$. If the power supply time $T_{HED}$ is greater than or equal to the expected discharge time $T_{VID}$, the handheld electronic device 101 may execute Step S303. On the contrary, if the handheld electronic device 101 judges that the power supply time is less than the expected discharge time, Step S305 is executed.

In the embodiment, in Step S303, the handheld electronic device 101 may limit the supply current SC provided by the first battery 103 to a current upper limit value $I_{limit}$ through the power manager in the virtual image display 102, wherein the current upper limit value $I_{limit}$ ($I_{limit} = I_{VID} - I_{BAT}$) is equal to a required current value $I_{VID}$ of the virtual image display 102 minus the default discharge current value $I_{BAT}$ of the second battery 104, where $I_{VID}$ may be generated according to the operation condition of the virtual image display 102 and may be detected by the power manager in the virtual image display 102.

It is worth mentioning that through the second battery 104 providing the partial current, the supply current SC provided by the first battery 103 of the handheld electronic device 101 to the virtual image display 102 may be limited (reduced). In other words, the discharge rate of the first battery 103 may be reduced, so that the usage time thereof can be prolonged.

On the other hand, in Step S305, the handheld electronic device 101 may activate the power saving mechanism of the handheld electronic device 101, and reduce the power consumption of the handheld electronic device 101 through reducing partial hardware performance of the handheld electronic device 101 to achieve the purpose of prolonging the usage time. The virtual image display system 100 may reduce the brightness of the screen backlight of the handheld electronic device 101; reduce the antenna emission performance of the handheld electronic device 101; and/or reduce the working clock of the handheld electronic device 101 to reduce the power consumption of the handheld electronic device 101. The power saving mechanism of the handheld electronic device 101 may also be any power saving means provided by the manufacturer of the handheld electronic device 101, and there is no particular limitation.

After the handheld electronic device 101 executes Step S305, since the power saving mechanism of the handheld electronic device 101 has been activated, a state of charge change rate S of the first battery 103 changes and decreases. At this time, the handheld electronic device 101 may re-execute Step S301 to re-calculate the power supply time $T_{HED}$ of the first battery 103.

In addition, in Step S304, the handheld electronic device 101 judges whether the state of charge $SOC_{VID}$ of the second battery 104 of the virtual image display 102 is less than or equal to a state of charge threshold VTH to judge whether the second battery 104 enters a low state of charge. The state of charge threshold VTH may be a state of charge lower limit of the second battery 104 defined by the designer. If the determination result in Step S304 is yes, it means that the second battery 104 is in the low state of charge. In order to prevent the second battery 104 from being forced to discharge to $I_{BAT}$ in the low state of charge to continuously provide partial power to the virtual image display 102, causing the operations of the virtual image display 102 and even the virtual image display system 100 to be unstable, the handheld electronic device 101 may execution Steps S306 and S307. If the determination result in Step S304 is no, the handheld electronic device 101 may re-execute S301 to calculate the power supply time $T_{HED}$ and the expected discharge time $T_{VID}$ to continuously manage the power of the virtual image display system 100.

In Step S306, since the second battery 104 is already in the low state of charge, in order to prevent the operation of the virtual image display system 100 from being unstable, it is not appropriate to allow the second battery 140 of the virtual image display 102 to release more current at this time. Therefore, in Step S306, the handheld electronic device 110 may enable the current value of the supply current SC to become the required current value $I_{VID}$ ($I_{limit}=I_{VID}$) of the virtual image display 102 again through the virtual image display 102.

In Step S307, the handheld electronic device 101 is used to activate the power saving mechanism of the virtual image system 100 to respectively reduce partial hardware performance of the handheld electronic device 101 and the virtual image display 102, thereby reducing the power consumption to achieve the purpose of prolonging the usage time. In Step S307, the virtual image system 100 may reduce the brightness of the screen backlight of the handheld electronic device 101; reduce the antenna emission performance of the handheld electronic device 101; and/or reduce the working clock of the handheld electronic device 101 to reduce the power consumption of the handheld electronic device 101. In addition, in Step S307, the virtual image system 100 may also reduce the charging current of the second battery 104 of the virtual image display 102; reduce the brightness of the screen backlight of the virtual image display 102; turn down the volume of the speaker of the virtual image display 102; reduce the display frame rate of the virtual image display 102; and/or reduce the working clock of the virtual image display 102 to reduce the power consumption of the virtual image display 102.

Figure 4A:
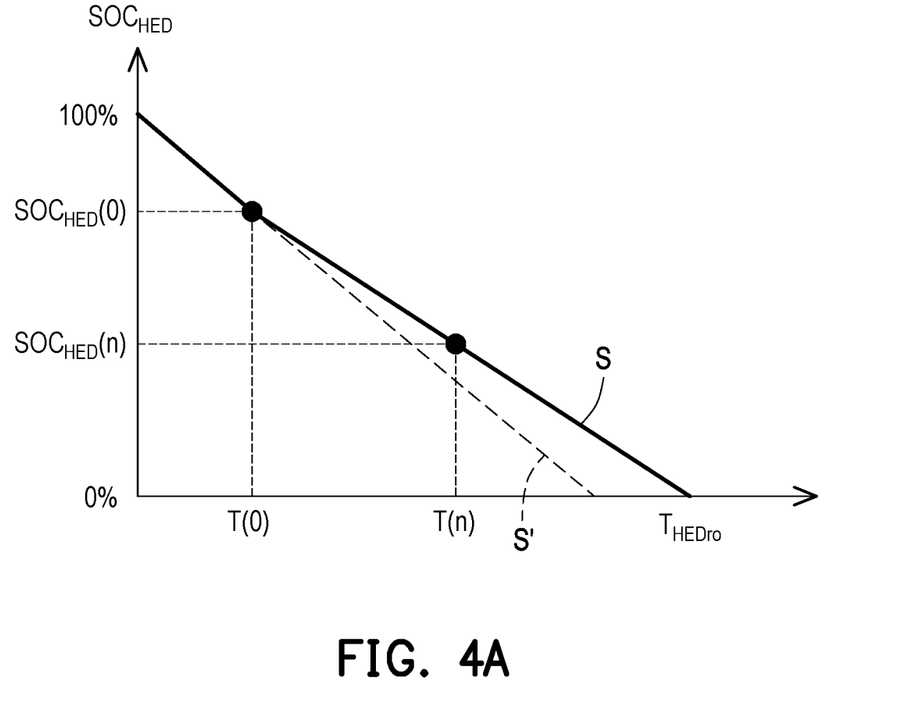
FIG. 4A and FIG. 4B are schematic diagrams of changes in states of charge of a first battery of a handheld electronic device and a second battery of a virtual display with time according to an embodiment of the disclosure.
Figure 4B:
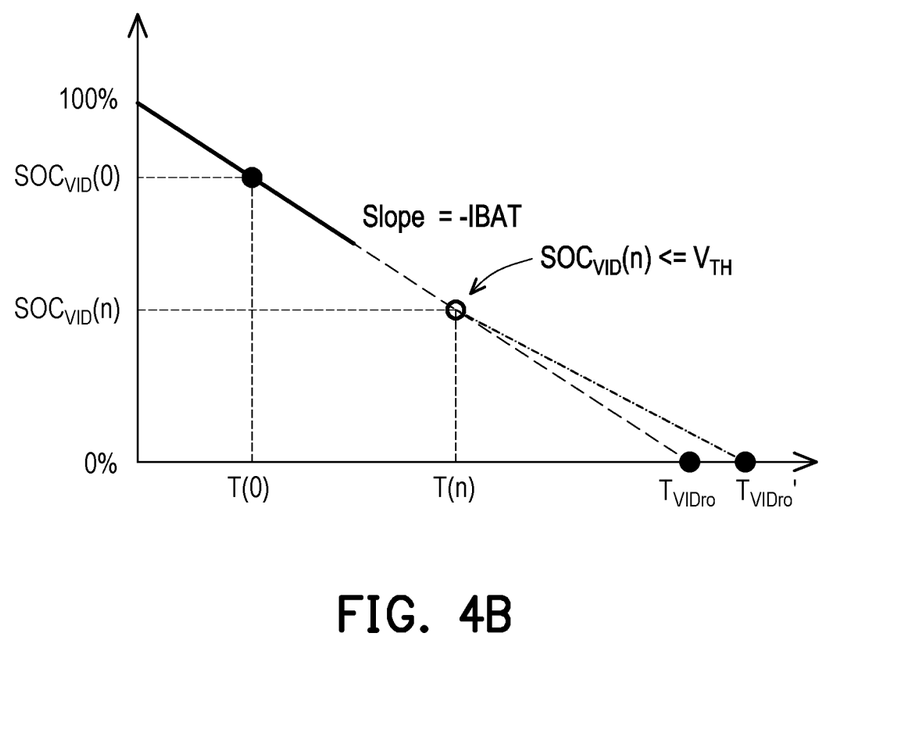

Please refer to FIG. 1, FIG. 3, FIG. 4A, and FIG. 4B. FIG. 4A and FIG. 4B are schematic diagrams of changes in states of charge of a first battery of a handheld electronic device and a second battery of a virtual display with time in a virtual image display system of an embodiment of the disclosure.

FIG. 4A is a diagram of changes in the state of charge $SOC_{HED}$ of the first battery 103 of the handheld electronic device 101 with a time T of the embodiment. A time point T(0) is a reference start time of executing Step 303 by the handheld electronic device 101, a time point T(n) is an n-th minute after the reference start time, and n is any positive real number. A time point $T_{HEDro}$ is the power exhaustion time of the first battery 103 of the handheld electronic device 101. State of charges $SOC_{HED}(0)$ and $SOC_{HED}(n)$ are the states of charge $SOC_{HED}$ of the first battery 103 respectively corresponding to the time points T(0) and T(n).

As shown in FIG. 4A, the solid oblique line (with a slope S) after the time point T(0) is the change curve of the state of charge $SOC_{HED}$ of the first battery 103 of the handheld electronic device 101 after the handheld electronic device 101 executes Step S303. If the handheld electronic device 101 does not execute Step 303, the change curve of the state of charge $SOC_{HED}$ of the first battery 103 may be represented by the dashed oblique line (with a slope S') therein. It can be clearly seen from the diagram in FIG. 4A that through Step 303 of the embodiment of the disclosure, the discharge rate of the first battery 103 of the handheld electronic device 101 may be reduced, and the usage time can be effectively prolonged.

FIG. 4B is a diagram of changes in the state of charge $SOC_{VID}$ of the second battery 104 of the virtual image display 102 with time of the embodiment. A time point $T_{VIDro}$ is the power exhaustion time of the second battery 104 of the virtual image display 102. States of charge $SOC_{VID}(0)$ and $SOC_{VID}(n)$ are the states of charge $SOC_{VID}$ of the second battery 104 of the virtual image display 102 corresponding to the time points T(0) and T(n).

As shown in FIG. 4B, the solid oblique line and the dashed oblique line after the time point T(0) represent the change curve of the state of charge $SOC_{VID}$ of the second battery 104 of the virtual image display 102 with the fixed discharge current $I_{BAT}$, wherein a slope Slope of the solid oblique line and the dashed oblique line is $-I_{BAT}$. In addition, when the state of charge $SOC_{VID}(n)$ of the second battery 104 is less than or equal to the state of charge threshold VTH at the time point T(n), the second battery 104 stops or slows down the discharge current and enables the state of charge $SOC_{VID}$ of the second battery 104 to slowly decrease (as shown by the dotted chain line), in order to effectively increase the usable time of the second battery to a time point $T_{VIDro}'$, wherein the absolute value of the slope of the dashed chain line is less than the absolute value of the slope Slope of the solid oblique line and the dashed oblique line.

Figure 5:
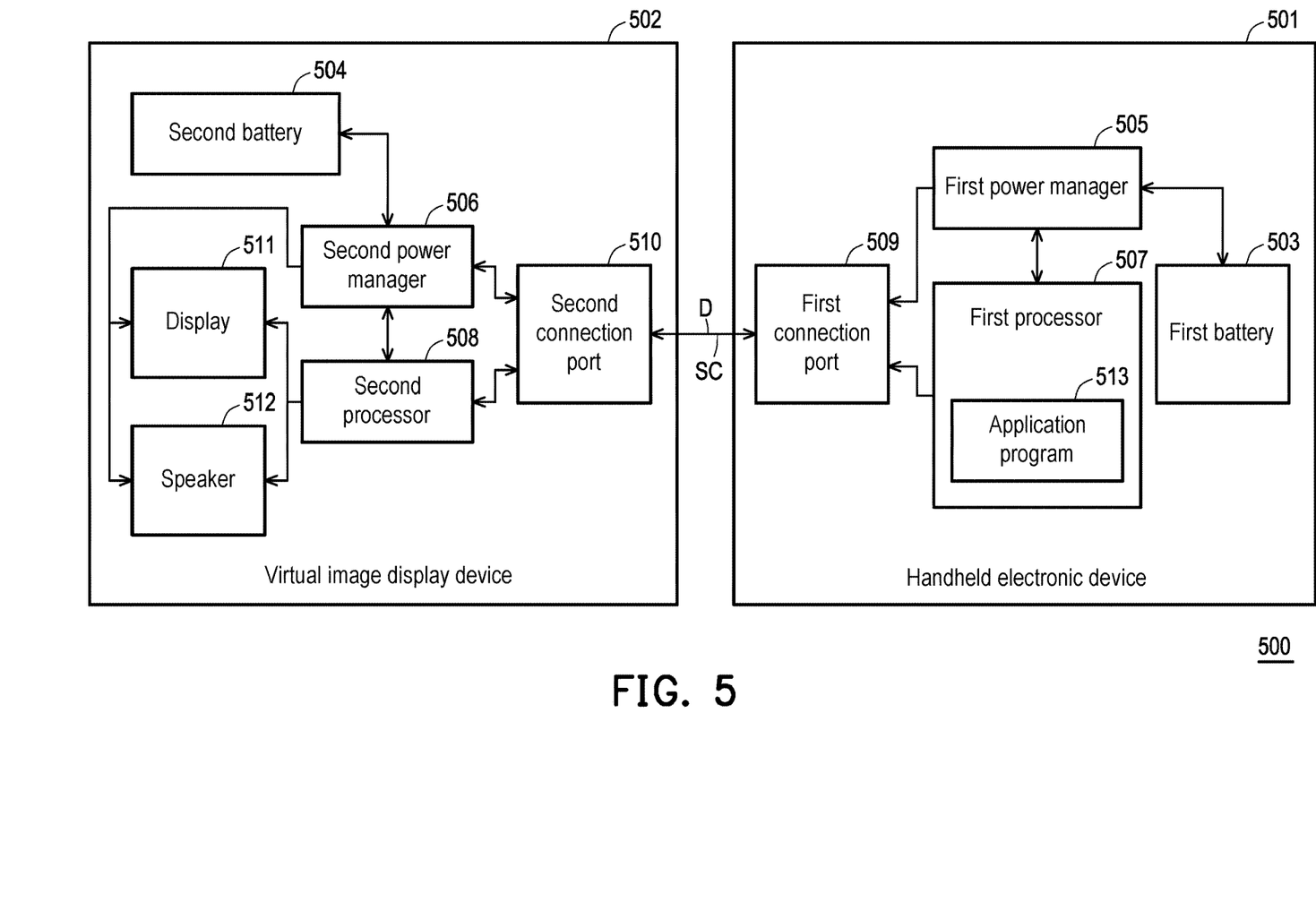
FIG. 5 is a block diagram of a virtual image display system according to an embodiment of the disclosure.

Please refer to FIG. 5 below. FIG. 5 is a block diagram of a virtual image display system according to an embodiment of the disclosure. A virtual image system 500 includes a handheld electronic device 501 and a virtual image display device 502. The handheld electronic device 501 includes a first battery 503, a first power manager 505, a first processor 507, and a first connection port 509. The virtual image display device 502 includes a second battery 504, a second power manager 506, a second processor 508, a second connection port 510, a display 511, and a speaker 512.

The first processor 507 and the second processor 508 may be, for example, central processing units (CPUs), other programmable general-purpose or special-purpose microprocessors, digital signal processors (DSPs), programmable controllers, application specific integrated circuits (ASICs), programmable logic devices (PLDs), other similar devices, or combinations of the devices that can load and execute computer programs.

The first power manager 505 is coupled to the first battery 503, the first connection port 509, and the first processor 507. The first processor 507 is coupled to the first connection port 509. The first connection port 509 is used to couple to the second connection port 510 of the virtual image display device 502.

The second power manager 506 is coupled to the second battery 504, the second processor 508, the second connection port 510, the display 511, and the speaker 512. The second processor 508 is coupled to the second connection port 510, the display 511, and the speaker 512.

The first processor 507 may be used to execute an application program 513. The application program 513 may execute the power management method of FIG. 2 or FIG. 4 of the disclosure to execute a power management mechanism of the virtual image display system 500. Through a coupling mechanism between the first connection port 509 and the second connection port 510, the supply current SC may be provided from the handheld electronic device 501 to the virtual image display device 502, and receiving and sending actions of data D between the handheld electronic device 501 and the virtual image display device 502 may also be performed. In an embodiment, the first connection port 509 and the second connection port 510 may be universal serial bus (USB) connection ports or may be any connection ports that can perform signal transmission known to persons skilled in the art. The receiving and sending actions of the data D may also be communicated and connected by wireless transmission.

In summary, the virtual image display system and the power management method of the disclosure calculates the power supply time of the first battery of the handheld electronic device and the expected discharge time of the second battery of the virtual image display, and compares the power supply time and the expected discharge time, thereby adjusting the supply current provided by the handheld electronic device to the virtual image display to improve the overall usage time of the virtual image display system.

What is claimed is:
1. A virtual image display system, comprising:
a handheld electronic device, having a first battery; and
a virtual image display, coupled to the handheld electronic device and having a second battery,
wherein the handheld electronic device is used to:
calculate a power supply time of the first battery;
calculate an expected discharge time of the second battery under a discharge condition;
compare the power supply time and the expected discharge time to generate a comparison result; and
adjust a supply current provided by the handheld electronic device to the virtual image display according to the comparison result;
wherein when the comparison result indicates that the power supply time is less than the expected discharge time, the handheld electronic device is used to activate a power saving mechanism of the handheld electronic device to reduce a power consumption of the handheld electronic device, wherein the power saving mechanism of the handheld electronic device comprises at least one of reducing a brightness of a screen backlight of the handheld electronic device; reducing an antenna emission performance of the handheld electronic device; and reducing a working clock of the handheld electronic device.

2. The virtual image display system according to claim 1, wherein the handheld electronic device is used to detect a state of charge of the first battery and a state of charge change rate of the first battery, and is used to divide the state of charge of the first battery by a first state of charge change rate of the first battery to calculate the power supply time.

3. The virtual image display system according to claim 1, wherein the discharge condition comprises:
a total capacitance of the second battery; and
a default discharge current value of the second battery, wherein
the handheld electronic device is used to detect a state of charge of the second battery, and is used to divide a product of the total capacitance of the second battery and the state of charge of the second battery by the default discharge current value of the second battery to calculate the expected discharge time.

4. The virtual image display system according to claim 1, wherein when the comparison result indicates that the power supply time is greater than or equal to the expected discharge time, the handheld electronic device is used to subtract a required current value of the virtual image display from a default discharge current value of the second battery to obtain a current upper limit value, and limit a current value of the supply current to the current upper limit value.

5. The virtual image display system according to claim 4, wherein when the comparison result indicates that the power supply time is greater than or equal to the expected discharge time, the handheld electronic is used to judge whether a state of charge of the second battery is less than or equal to a state of charge threshold, and when the state of charge of the second battery is less than or equal to equal to the state of charge threshold, the handheld electronic device is used to equate the supply current with the required current value of the virtual image display.

6. The virtual image display system according to claim 4, wherein when the state of charge of the second battery is less than or equal to the state of charge threshold, the handheld electronic device is further used to activate a power saving mechanism of the virtual image display system to reduce power consumptions of the handheld electronic device and the virtual image display, wherein the power saving mechanism of the virtual image display system comprises at least one of reducing a charging current of the second battery; turning down a speaker volume of the virtual image display; reducing a brightness of a screen backlight of the virtual image display, reducing a display frame rate of the virtual image display, and reducing a frequency of a working clock of the virtual image display.

7. A power management method, applicable between a handheld electronic device having a first battery and a virtual image display having a second battery, the power management method comprising:
calculating a power supply time of the first battery;
calculating an expected discharge time of the second battery under a discharge condition;
comparing the power supply time and the expected discharge time to generate a comparison result; and
adjusting a supply current provided by the handheld electronic device to the virtual image display according to the comparison result;
wherein when the comparison result is that the power supply time is less than the expected discharge time, the power management method further comprises:

activating a power saving mechanism of the handheld electronic device to reduce a power consumption of the handheld electronic device, wherein the power saving mechanism of the handheld electronic device comprises at least one of reducing a brightness of a screen backlight of the handheld electronic device, reducing an antenna emission performance of the handheld electronic device, and reducing a working clock of the handheld electronic device.

8. The power management method according to claim 7, wherein the step of calculating the power supply time of the first battery comprises:

detecting a first state of charge of the first battery;
detecting a state of charge change rate of the first battery; and
dividing a state of charge of the first battery by the first state of charge change rate of the first battery to calculate the power supply time.

9. The power management method according to claim 7, wherein the discharge condition comprises a total capacitance of the second battery and a default discharge current value of the second battery, wherein the step of calculating the expected discharge time of the second battery under the discharge condition comprises:

detecting a state of charge of the second battery; and
dividing a product of the total capacitance of the second battery and the state of charge of the second battery by the default discharge current value of the second battery to calculate the expected discharge time.

10. The power management method according to claim 7, wherein when the comparison result is that the power supply time is greater than or equal to the expected discharge time, the power management method further comprises:

subtracting a default discharge current value of the second battery from a required current value of the virtual image display to obtain a current upper limit value; and
limiting a current value of the supply current to the current upper limit value.

11. The power management method according to claim 10, wherein when the comparison result is that the power supply time is greater than or equal to the expected discharge time, the power management method further comprises:

judging whether a state of charge of the second battery is less than or equal to a state of charge threshold, wherein when the state of charge of the second battery is less than or equal to the state of charge threshold:
equating the supply current with the required current value of the virtual image display.

12. The power management method according to claim 11, wherein when the state of charge of the second battery is less than or equal to the state of charge threshold, the power management method further comprises:

activating a power saving mechanism of the virtual image display system to reduce power consumptions of the handheld electronic device and the virtual image display,
wherein the power saving mechanism of the virtual image display system comprises at least one of reducing a charging current of the second battery, reducing a speaker volume of the virtual image display, reducing a brightness of a screen backlight of the virtual image display, reducing a display frame rate of the virtual image display, and reducing a working clock of the virtual image display.

* * * * *